United States Patent
Kim et al.

(10) Patent No.: US 7,839,761 B2
(45) Date of Patent: Nov. 23, 2010

(54) APPARATUS AND METHOD FOR TRANSMITTING AND RECEIVING MAP INFORMATION IN A COMMUNICATION SYSTEM

(75) Inventors: Tae-Young Kim, Seongnam-si (KR); Jae-Hee Cho, Seoul (KR); Jae-Weon Cho, Suwon-si (KR); Jeong-Ho Park, Seoul (KR); Kwan-Hee Roh, Hwaseong-si (KR); Jin-Kyu Koo, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 142 days.

(21) Appl. No.: 12/036,557

(22) Filed: Feb. 25, 2008

(65) Prior Publication Data

US 2008/0205258 A1    Aug. 28, 2008

(30) Foreign Application Priority Data

Feb. 23, 2007    (KR) ...................... 10-2007-0018374

(51) Int. Cl.
*H04J 9/00*    (2006.01)
(52) U.S. Cl. ........................ 370/204; 370/208; 375/260
(58) Field of Classification Search ................. 370/208, 370/327; 375/260
See application file for complete search history.

(56) References Cited

U.S. PATENT DOCUMENTS

| 2007/0140167 | A1* | 6/2007 | Jang et al. | 370/329 |
| 2007/0263735 | A1* | 11/2007 | Tong et al. | 375/260 |
| 2007/0286066 | A1* | 12/2007 | Zhang et al. | 370/208 |
| 2008/0159220 | A1* | 7/2008 | Kitchin et al. | 370/329 |

* cited by examiner

*Primary Examiner*—Albert T Chou
(74) *Attorney, Agent, or Firm*—Jefferson IP Law, LLP

(57) ABSTRACT

A method and apparatus for transmitting and receiving MAP information in a communication system are provided. A base station acquires channel quality information of each mobile station, generates sub-MAPs using MAP information, to which at least one of a coding scheme, a modulation scheme and a repetition scheme is applied, separately for each mobile station according to the channel quality information, and transmits the generated sub-MAPs. A mobile station receives MAP information from the base station, detects a sub-MAP allocated to the mobile station from the received MAP information, and restores the detected sub-MAP to MAP information using at least one of a corresponding decoding scheme, demodulation scheme and repetition scheme corresponding to coding scheme, modulation scheme and repetition scheme applied in the base station, based on channel quality information of the mobile station. Accordingly, system overhead can be reduced.

4 Claims, 4 Drawing Sheets

APPARATUS AND METHOD FOR TRANSMITTING AND RECEIVING MAP INFORMATION IN A COMMUNICATION SYSTEM

PRIORITY

This application claims the benefit under 35 U.S.C. §119 (a) of a Korean patent application filed in the Korean Intellectual Property Office on Feb. 23, 2007 and assigned Serial No. 2007-18374, the entire disclosure of which is hereby incorporated by reference.

BACKGROUND OF THE INVENTION

1. Field of the Invention

The present invention relates generally to a communication system. More particularly, the present invention relates to an apparatus and method for transmitting and receiving MAP information in a communication system.

2. Description of the Related Art

In a communication system, a transmitter and a receiver, for example a Base Station (BS) and a Mobile Station (MS), use a frame structure for both the transmission and the reception of data.

In a conventional communication system, the transmission of data using a frame structure includes the transmission of MAP information. MAP information, in data transmitted by the BS, includes data extraction information, such as position and size of the data, allocated separately for each mobile station, and a variety of information used for providing service separately to each mobile station. Therefore, each mobile station receiving the MAP can extract its own transmitted data burst in the frame by analyzing the MAP information.

In the conventional communication system, when the BS transmits the MAP information, the BS applies therein the same coding scheme and the same modulation scheme for all MSs to which resources are allocated. In this case, the coding scheme and the modulation scheme are determined and applied by the BS such that even an MS located in a cell boundary can receive the MAP information without error. Therefore, to ensure reception by even an MS in a cell boundary, the BS transmits the MAP information using a low modulation order, a low coding rate, repetition, etc. For example, the BS may use Quadrature Phase Shift Keying (QPSK) 1/2 and set the number of repetitions to 6 (repetition=6) to repeatedly transmit the MAP up to six times to ensure reception by an MS in a boundary area.

described above, the MAP information should be determined such that even an MS located in a cell boundary can receive it without error. However, the MAP information transmitted by the BS, which is a kind of control information for data restoration, is a source of overhead in the entire system. Since the MAP information transmitted to an MS located in a non-cell boundary is transmitted taking into account an MS located in a cell boundary, more than necessary coding schemes and modulation schemes are applied, which unnecessarily increases system overhead.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting and receiving MAP information in a communication system.

Another aspect of the present invention is to provide a MAP information transmission/reception apparatus and method for reducing overhead caused by MAP information transmission/reception in a communication system.

According to an aspect of the present invention, a method for transmitting MAP information by a base station in a communication system is provided. The method includes acquiring channel quality information of each mobile station, generating sub-MAPs, using MAP information to which at least one of a coding scheme, a modulation scheme and a repetition scheme is applied, separately for each mobile station according to the channel quality information and transmitting the generated sub-MAPs.

According to another aspect of the present invention, a method for receiving MAP information by a mobile station in a communication system is provided. The method includes receiving MAP information from a base station, detecting a sub-MAP allocated to the mobile station from the received MAP information and restoring the detected sub-MAP to MAP information using at least one of a decoding scheme, a demodulation scheme and a repetition scheme corresponding to coding scheme, modulation scheme and repetition scheme applied in the base station, based on channel quality information of the mobile station.

According to further another aspect of the present invention, an apparatus for transmitting MAP information in a communication system is provided. The apparatus includes a base station for acquiring channel quality information of each mobile station, for generating sub-MAPs using MAP information to which at least one of a coding scheme, a modulation scheme and a repetition scheme is applied, separately for each mobile station according to the channel quality information, and for transmitting the generated sub-MAPs.

According to yet another aspect of the present invention, an apparatus for receiving MAP information in a communication system is provided. The apparatus includes a mobile station for receiving MAP information from a base station, for detecting a sub-MAP allocated to the mobile station from the received MAP information, and for restoring the detected sub-MAP to MAP information using at least one of a decoding scheme, a demodulation scheme and a repetition scheme corresponding to a coding scheme, a modulation scheme and a repetition scheme applied in the base station, based on channel quality information of the mobile station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for transmitting and receiving MAP information in a communication system. A description of exemplary embodiments of the present invention will be made herein with reference to a communication system having a tile-based subchannel structure. However, it is to be understood that this is by way of example only and is not considered limiting; that is the present invention may also be applied to communication systems that different subchannel structures. In an exemplary communication system, a transmitter transmits the data transmitted in MAP information, using a sub-MAP to which a coding scheme, a modulation technique, a repetition technique, etc. are applied separately for each mobile station. In an exemplary implementation, when a communication system uses the sub-MAP, the base station transmitting the sub-MAP acquires the entire MAP region's size information from a MAP header including size information of each sub-MAP, and interleaves the sub-MAP within the entire MAP region on a symbol-by-symbol basis before transmission. The MAP information in the data transmitted by the base station includes data extraction information (or resource allocation information) such as position and size of the data, allocated separately for each mobile station in a frame, and a variety of information used for providing a service separately to each mobile station. Therefore, a mobile station, receiving the MAP information, can extract its own transmitted data burst in the frame by analyzing the MAP information.

In the following exemplary implementation, a transmitter transmitting MAP information is assumed to be a base station, and a receiver receiving the MAP information is assumed to be a mobile station. The base station transmits the MAP information to mobile stations in the sub-MAP form. However, these designations of transmitter and receiver are merely for ease of description.

Figure 1:
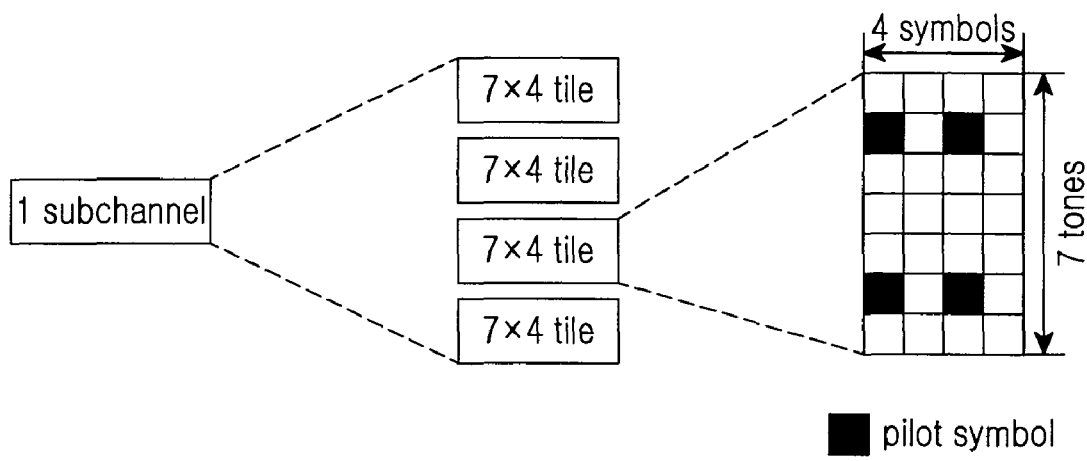
FIG. 1 is a diagram illustrating a tile structure according to an exemplary embodiment of the present invention.

With reference to FIG. 1, a description will now be made of a tile structure for a communication system according to an exemplary embodiment of the present invention.

FIG. 1 is a diagram illustrating a tile structure according to an exemplary embodiment of the present invention.

Referring to FIG. 1, a subchannel structure of a downlink frame is shown by way of example. The downlink subchannel is assumed to include 4 tiles wherein each of the tiles includes 7 tone or subcarrier intervals and 4 symbol intervals. As a result, each of the tiles has a 7×4 tile structure. Furthermore, each tile includes, for example, 4 pilots.

The pilots in each of the tiles are dedicated pilots and can be independently applied in the tile according to a transmission mode of a transmitter. As a result, the communication system described below can support both a single-antenna transmission mode and a multi-antenna transmission mode in the same zone (i.e., cell) or in the same sector, as it uses the tile structure described above.

A size of the tile is determined by taking into account the coherence bandwidth and coherence time of a channel. In addition, it is assumed that for the 7×4 tile, there is no significant change in the channel characteristic on the frequency domain and the time domain within 7 subcarrier intervals and 4 symbol intervals, i.e., Orthogonal Frequency Division Multiplexing (OFDM) symbol intervals.

Figure 2:
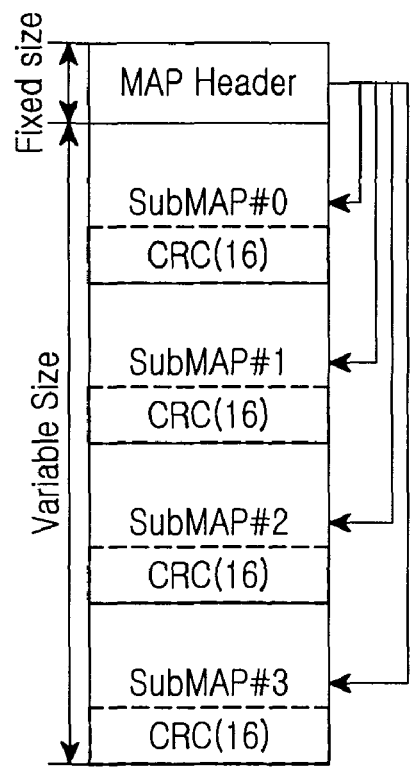
FIG. 2 is a diagram illustrating a sub-MAP according to an exemplary embodiment of the present invention.

FIG. 2 is a diagram illustrating a sub-MAP structure according to an exemplary embodiment of the present invention.

Referring to FIG. 2, a frame transmitted/received between a base station and a mobile station includes a header (MAP header) and at least one sub-MAP. The MAP header has a fixed size and the number of sub-MAPs is variable.

A base station uses a plurality of sub-MAPs taking into account the channel environments of mobile stations within the service area of the base station. When transmitting the sub-MAPs, the base station uses a different coding scheme and a different modulation scheme for each sub-MAP. Therefore, the plurality of sub-MAPs use a smaller amount of resources compared to the conventional MAP which is transmitted using the same coding scheme and the same modulation scheme for all mobile stations within the service area.

In FIG. 2, 4 sub-MAPs are shown by way of example. As illustrated, each sub-MAP includes 16-bit Cyclic Redundancy Check (CRC) data for error detection of transmission data.

An exemplary base station of the present invention determines a channel environment, i.e., channel quality information, of each mobile station depending on a Channel Quality Information (CQI) channel (CQICH). The base station selects a sub-MAP for MAP information transmission to each mobile station according to the channel quality information of each mobile station, and transmits the MAP information through the selected sub-MAP.

The base station applies a higher-rate coding scheme or a higher-order modulation scheme to a sub-MAP to be transmitted to a mobile station having a better channel state. For the modulation scheme used in this case, 16-ary Quadrature Amplitude Modulation (16QAM) can be applied by way of example. Also, the base station uses a lower-rate coding scheme or a lower-order modulation scheme for a sub-MAP to be transmitted to a mobile station having a weaker channel state, for example, a mobile station located in a cell boundary area. For the modulation scheme used in this case, Quadrature Phase Shift Keying (QPSK) can be applied by way of example. The sub-MAP for the mobile stations having the weak channel state can also apply a repetition technique.

With the use of the sub-MAP transmission scheme, the base station can transmit MAP information corresponding to each mobile station taking into account the channel state thereof, thereby contributing to an increase in the resource efficiency.

A MAP header is used for transmitting MAP information using the sub-MAP. The MAP header includes information such as the number of sub-MAPs and the size of each sub-MAP. Therefore, each mobile station detects its own allocated sub-MAP among the sub-MAPs transmitted by the base station, and can receive MAP information through the detected sub-MAP. The MAP header transmitted for detection of the sub-MAP can use a modulation scheme and a coding scheme, for example, a lower-order modulation scheme and a lower-rate coding scheme, with which its restoration can be easily achieved at each mobile station, including a mobile station located in a cell boundary area.

In some cases, when using the sub-MAP structure as described above, the number of mobile stations allocated to a particular sub-MAP may be small. In this case, the use of sub-MAPs may decrease frequency diversity gain as compared to the use of conventional MAP information. Accordingly, exemplary embodiments of the present invention provide structures of a base station and a mobile station that consider frequency diversity gain.

Figure 3:
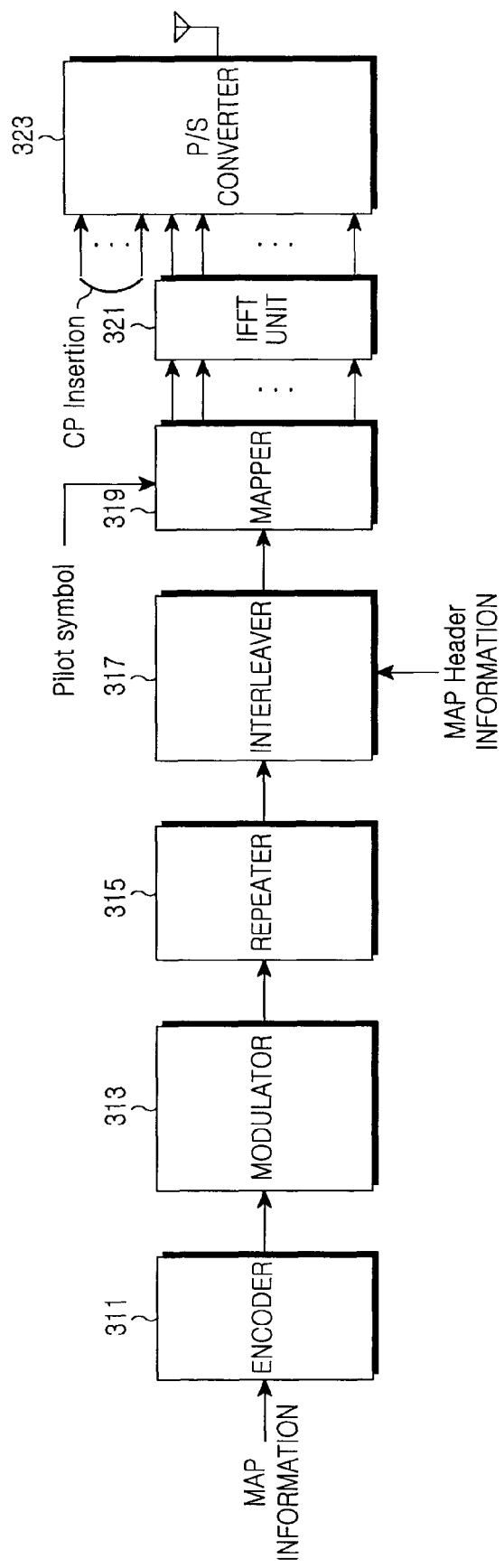
FIG. 3 is a diagram illustrating a structure of a base station for transmitting sub-MAP information according to an exemplary embodiment of the present invention.

FIG. 3 is a diagram illustrating a structure of a base station for transmitting sub-MAP information according to an exemplary embodiment of the present invention.

Referring to FIG. 3, a base station includes an encoder 311, a modulator 313, a repeater 315, an interleaver 317, a mapper 319, an Inverse Fast Fourier Transform (IFFT) unit 321, and a Parallel-to-Serial (P/S) converter 323.

The encoder 311 performs coding on the input MAP information using a coding scheme previously applied thereto. The encoder 311 generates coded bits by performing coding on MAP information to be included in a sub-MAP corresponding to each mobile station using a different coding rate depending on the channel quality information of the mobile station.

The modulator 313 generates a sub-MAP symbol by applying a different modulation scheme to the coded bits. The modulator 313 sets a modulation scheme for the coded bits to be included in a sub-MAP for each mobile station according to the channel quality information of each mobile station.

The repeater 315 repeatedly transmits the sub-MAP symbol for as many times as a preset repetition. For the coded bits to be included in a sub-MAP corresponding to each mobile station, the repeater 315 sets the repetition according to the channel quality information of each mobile station. Herein, the repeater 315 can either set a different repetition separately for each sub-MAP according to the channel state of each mobile station, or set the same repetition for each sub-MAP.

The interleaver 317 receives header information, i.e., MAP header information, to be included in a transmission frame of the transmitter, and acquires the entire MAP region's size information using the MAP header information. The interleaver 317 can determine the size of the MAP region allocated for sub-MAP transmission in the entire MAP region, and performs interleaving so that sub-MAPs are uniformly distributed in the tile included throughout the entire MAP region.

The mapper 319 receives pilot symbols, and maps the received pilot symbols and the interleaved sub-MAPs to each subcarrier. The mapper 319 converts the subcarriers in parallel.

The IFFT unit 321 generates transmission signals by IFFT-transforming the subcarriers. The P/S converter 323 converts the parallel transmission signals into a serial signal, and transmits them via a transmit antenna. In this case, the P/S converter 323 inserts a Cyclic Prefix (CP) into the transmission signal.

Next, with reference to FIG. 4, a description will be made of a mobile station's structure according to an exemplary embodiment of the present invention.

Figure 4:
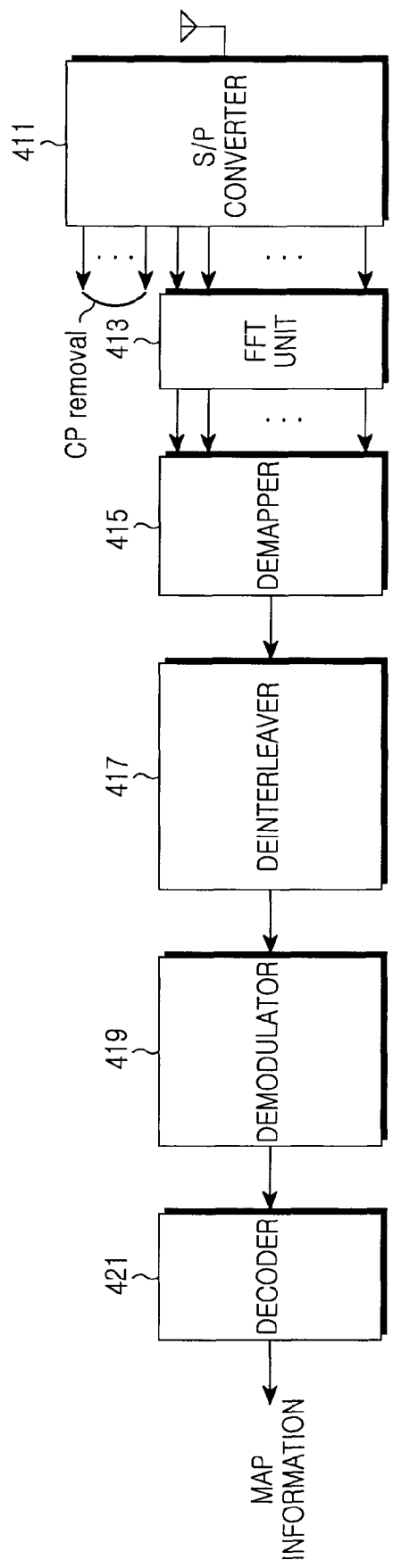
FIG. 4 is a diagram illustrating a structure of a mobile station for receiving sub-MAP information according to an exemplary embodiment of the present invention.

FIG. 4 is a diagram illustrating a structure of a mobile station for receiving sub-MAP information according to an exemplary embodiment of the present invention.

Referring to FIG. 4, a mobile station includes a Serial-to-Parallel (S/P) converter 411, a Fast Fourier Transform (FFT) unit 413, a demapper 415, a deinterleaver 417, a demodulator 419, and a decoder 421.

The S/P converter 411 receives a signal using a receive antenna, and converts the received signal into a plurality of parallel signals. The S/P converter 411 removes a CP included in the received signal.

The FFT unit 413 performs FFT on the parallel-converted received signal. The demapper 415 demaps the FFT-processed signal. The demapper 415 converts the FFT-processed signal into a serial signal.

The deinterleaver 417 deinterleaves a sub-MAP corresponding to the mobile station among the sub-MAPs interleaved in the entire MAP region using the demapped signal, to detect a sub-MAP symbol. The deinterleaver 417 can determine the entire MAP region by restoring the MAP header, and can deinterleave a sub-MAP corresponding to the mobile station from among the sub-MAPs included in the entire MAP region.

The demodulator 419 detects a modulation scheme applied to the sub-MAP symbol from the MAP header. The demodulator 419 demodulates the sub-MAP symbol using a demodulation scheme corresponding to the detected modulation scheme, to detect coded bits.

The decoder 421 detects a coding scheme applied to the sub-MAP symbol from the MAP header. The decoder 421 decodes the bits coded by the base station using a decoding scheme corresponding to the detected coding scheme, to detect MAP information transmitted by the transmitter.

Next, with reference to FIG. 5, a description will be made of an exemplary tile structure according to an exemplary embodiment of the present invention.

Figure 5:
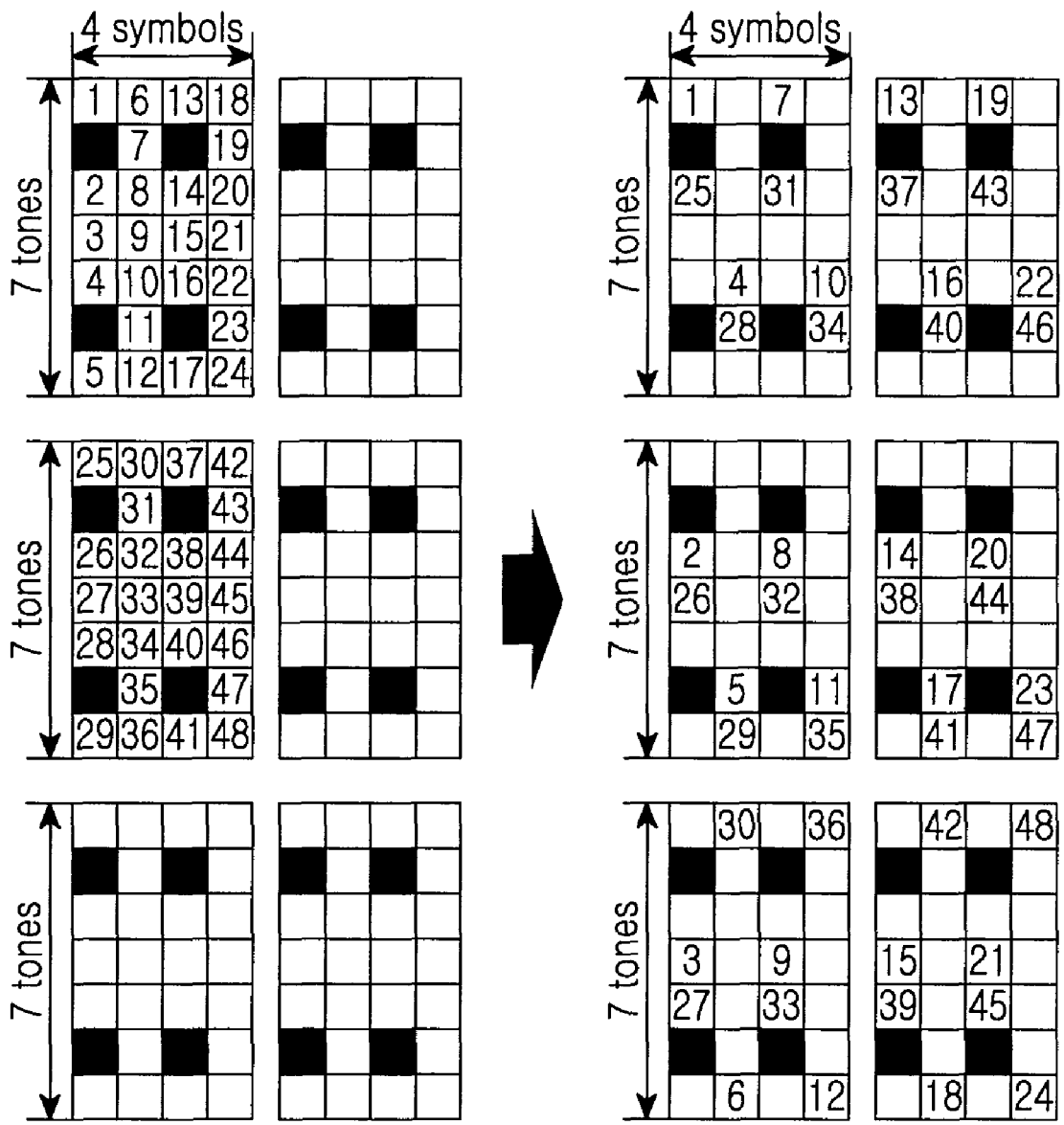
FIG. 5 is a diagram schematically illustrating a tile structure for transmission/reception of MAP information according to an exemplary embodiment of the present invention.

FIG. 5 is a diagram schematically illustrating a tile structure for transmission/reception of MAP information according to an exemplary embodiment of the present invention.

Referring to FIG. 5, there is shown a tile structure wherein each tile has, for example, a 7×4 size, and each tile includes, for example, 4 pilot symbols therein. In the exemplary implementation illustrated in FIG. 5, the number of tiles included in the entire MAP region that the base station has acquired from a MAP header is six.

In the illustrated example of FIG. 5, a MAP message is transmitted over 144 subcarriers. As a result, if the number of symbols allocated to particular sub-MAP is assumed to be 48, sub-MAP information is transmitted in only 2 tiles. In this case, it is difficult to acquire frequency diversity gain. Therefore, an exemplary embodiment of the present invention interleaves the particular sub-MAP in all tiles (e.g., 6 tiles) by means of an interleaver in the transmitter. To this end, exemplary embodiments of the present invention uniformly allocate (distribute) the sub-MAP symbol in all tiles, thereby acquiring the frequency diversity gain.

As the interleaver used in the present invention, a symbol interleaver for performing interleaving on a symbol-by-symbol basis can be used by way of example. The size of the entire MAP region used for transmitting a sub-MAP at the transmitter of an exemplary embodiment of the present invention, and/or the number of sub-MAPs that the transmitter transmits are subject to change according to the system condition and/or setting.

As is apparent from the foregoing description, for transmission/reception of the MAP message in the communication system, exemplary embodiments of the present invention transmit the MAP message by applying different coding schemes, modulation schemes and repetition techniques through a plurality of sub-MAPs. Therefore, exemplary embodiments of the present invention can contribute to a reduction in the overhead caused by the MAP message transmission/reception. In addition, exemplary embodiments of the present invention interleave the sub-MAP throughout the entire MAP region to uniformly distribute it in a plurality of tiles for its transmission, thereby acquiring frequency diversity gain.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for transmitting MAP information by a base station in a communication system, the method comprising:
   acquiring channel quality information of each of a plurality of mobile stations;
   generating sub-MAPs, to which at least one of a coding scheme, a modulation scheme and a repetition scheme is applied, separately for each of the plurality of mobile stations according to the respective channel quality information; and
   transmitting a MAP message including the sub-MAPs on a plurality of subcarriers,
   wherein the sub-MAPs are uniformly distributed in all tiles included throughout an entire MAP region, each tile including a predetermined number of subcarriers and a predetermined number of symbol intervals,
   wherein the generating of the sub-MAPs comprises using at least one of a different modulation scheme and a different coding scheme for each sub-MAP information,
   wherein the MAP message includes a MAP header including size information of the sub-MAP and information on the number of the sub-MAPs,
   wherein the acquiring of the channel quality information comprises acquiring the channel quality information from each of the plurality of mobile stations over a channel quality information channel, and
   wherein the transmitting of the generated sub-MAPs comprises:
      interleaving the sub-MAPs throughout the entire MAP region over which the sub-MAPs are transmitted, on a symbol-by-symbol basis;
      mapping the interleaved sub-MAPs to each subcarrier;
      performing Inverse Fast Fourier Transform (IFFT) on the mapped subcarriers to generate transmission signals;
      converting the generated transmission signals into a serial transmission signal; and
      transmitting the serial transmission signal.

2. A method for receiving MAP information by a mobile station in a communication system, the method comprising:
   receiving a MAP message including sub-MAPs, to which at least one of a coding scheme, a modulation scheme and a repetition scheme is applied, separately for each of a plurality of mobile stations according to corresponding channel quality information, from a base station on a plurality of subcarriers;
   detecting a sub-MAP allocated to the mobile station from the MAP message; and
   restoring the detected sub-MAP to MAP information corresponding to the mobile station using at least one of a decoding scheme, a demodulation scheme and a repetition scheme corresponding to a coding scheme, a modulation scheme and a repetition scheme applied by the base station, based on channel quality information of the mobile station,
   wherein the sub-MAPs are uniformly distributed in all tiles included throughout an entire MAP region, each tile including a predetermined number of subcarriers and a predetermined number of symbol intervals, and
   wherein the detecting of the sub-MAP comprises:
      detecting a MAP header from the MAP message;
      detecting the sub-MAP using information on a size of the sub-MAP and the number of sub-MAPs included in the MAP header;
      deinterleaving the sub-MAPs from the entire MAP region over which the sub-MAPs are transmitted, on a symbol-by-symbol basis;
      converting a signal received from the base station into a parallel signal;
      performing a Fast Fourier Transform (FFT) on the converted parallel signal;
      demapping the FFT-processed signal; and
      deinterleaving the demapped signal to detect the MAP message.

3. An apparatus for transmitting MAP information in a communication system, the apparatus comprising:
   a base station for acquiring channel quality information of each of a plurality of mobile stations, for generating sub-MAPs, to which at least one of a coding scheme, a modulation scheme and a repetition scheme is applied, separately for each of the plurality of mobile stations according to the respective channel quality information, and for transmitting a MAP message including the sub-MAPs on a plurality of subcarriers,
   wherein the sub-MAPs are uniformly distributed in all tiles included throughout an entire MAP region, each tile including a predetermined number of subcarriers and a predetermined number of symbol intervals,
   wherein the generating of the sub-MAPs comprises using at least one of a different modulation scheme and a different coding scheme for each sub-MAP information,
   wherein the MAP message includes a MAP header comprising size information of each of the sub-MAPs and information on the number of the sub-MAPs,
   wherein the base station comprises:
      an interleaver for interleaving the sub-MAPs throughout the entire MAP region over which the sub-MAPs are transmitted, on a symbol-by-symbol basis,
      an encoder for receiving the MAP information and coding the received MAP information separately for each of the plurality of mobile stations using the respective channel quality information, to generate coded bits;
      a modulator for modulating the coded bits separately for each of the plurality of mobile stations using the respective channel quality information, to generate a sub-MAP symbol;
      a repeater for setting a repetition for the sub-MAP symbol separately for each of the plurality of mobile stations using the respective channel quality information;
      a mapper for mapping the interleaved sub-MAPs to each subcarrier;
      an Inverse Fast Fourier Transform (IFFT) unit for performing IFFT on the mapped subcarriers to generate transmission signals; and a parallel-to-serial converter for converting the generated transmission signals into a serial transmission signal and for transmitting the serial transmission signal, wherein the base station acquires the channel quality information from each of the plurality of mobile stations over a channel quality information channel.

4. An apparatus for receiving MAP information in a communication system, the apparatus comprising:

a mobile station for receiving a MAP message including sub-MAPs, to which at least one of a coding scheme, a modulation scheme and a repetition scheme is applied, separately for each of a plurality of mobile stations according to corresponding channel quality information, from a base station on a plurality of subcarriers, for detecting a sub-MAP allocated to the mobile station from the MAP message, and for restoring the detected sub-MAP to MAP information corresponding to the mobile station using at least one of a decoding scheme, a demodulation scheme and a repetition scheme corresponding to a coding scheme, a modulation scheme and a repetition scheme applied by the base station, based on channel quality information of the mobile station, wherein the sub-MAPs are uniformly distributed in all tiles included throughout an entire MAP region, each tile including a predetermined number of subcarriers and a predetermined number of symbol intervals, wherein the mobile station detects a MAP header from the MAP message and detects the sub-MAP using information on a size of the sub-MAP and the number of sub-MAPs included in the MAP header, wherein the mobile station comprises:

a deinterleaver for deinterleaving the sub-MAPs from the entire MAP region over which the sub-MAPs are transmitted, on a symbol-by-symbol basis, to detect the sub-MAP;

a demodulator for demodulating the deinterleaved sub-MAP using the demodulation scheme corresponding to the modulation scheme of the base station to detect bits coded by the base station;

a decoder for decoding the bits using the decoding scheme corresponding to the coding scheme of the base station to detect sub-MAP information;

a serial-to-parallel converter for converting a signal received from the base station into a parallel signal;

a Fast Fourier Transform (FFT) unit for performing FFT on the converted parallel signal; and a demapper for demapping the FFT-processed signal and for outputting the demapped signal to the deinterleaver.

* * * * *